United States Patent [19]

Kugler et al.

[11] 3,938,604
[45] Feb. 17, 1976

[54] SYSTEM FOR STEERING AND DRIVING A FULL-TRACK VEHICLE

[75] Inventors: Artur Kugler, Hainhofen, near Augsburg; Franz Xaver Zaunberger, Augsburg, both of Germany

[73] Assignee: Zahnraderfabrik Renk Aktiengesellschaft, Augsburg, Germany

[22] Filed: Mar. 17, 1975

[21] Appl. No.: 559,229

[30] Foreign Application Priority Data

Mar. 15, 1974 Germany............................ 2412562

[52] U.S. Cl................................. 180/6.44; 74/720.5
[51] Int. Cl.².......................................... B62D 11/10
[58] Field of Search ............ 180/6.44, 6.7; 74/720.5

[56] References Cited
UNITED STATES PATENTS

| | | | |
|---|---|---|---|
| 3,373,636 | 3/1968 | Livezey et al...................... | 180/6.7 X |
| 3,383,953 | 5/1968 | Christenson ........................ | 74/720.5 |
| 3,392,602 | 7/1968 | Frost.................................... | 180/6.44 |

*Primary Examiner*—Philip Goodman
*Attorney, Agent, or Firm*—Karl F. Ross; Herbert Dubno

[57] ABSTRACT

A full-track vehicle has an engine connected via a pair of differentials to a pair of tracks. A steering shaft extending between the differentials is rotatable in one sense for deflection of the vehicle to one side during forward advance and in the other direction for deflection toward the other side. This steering shaft is connected to the planet carrier of a primary planet gear assembly and to the ring gear of an intermediate planetary gear assembly. The sun gears of both of these assemblies are connected to the output side of a reversible variable-speed transmission whose input side is connected directly to the engine. The ring gear of the primary planetary gear assembly is connectable to a brake which may arrest its rotation and the planet carrier of the intermediate planetary gear assembly is connected to the planet carrier of a left-turn planetary gear assembly and the ring gear of a right-turn planetary gear assembly. The ring gear of the left-turn assembly is provided with a brake as is the planet carrier of the right-turn assembly, and the sun gears of both of these assemblies are directly connected to the engine. For minor deflections the primary brake is closed and the transmission alone directly rotates the sun gear of the primary gear assembly and thereby rotates the steering shaft in the necessary direction. For greater deflection the left- or right-turn brakes are closed and the output rotation of the variable-speed reversible transmission is subtracted from the rotation speed of the sun gears of the turn gear assemblies, and for greatest possible deflection the output rotation of the transmission is added to the rotation of the sun gears. A Z-shaped cam is provided to effect this increasing, decreasing, and reversing operation of the transmission.

10 Claims, 7 Drawing Figures

SYSTEM FOR STEERING AND DRIVING A FULL-TRACK VEHICLE

FIELD OF THE INVENTION

The present invention relates to a drive system for a full-track vehicle. More particularly this invention concerns a combined drive and steering system for such a vehicle.

BACKGROUND OF THE INVENTION

A full-track vehicle has a pair of tracks usually connected through a pair of differentials to a single drive engine. The differentials are interconnected by a steering shaft or similar element which is rotatable in one sense to advance one of the tracks faster than another, thereby causing the vehicle to turn to one side, and rotatable in the opposite sense to advance the other track faster than the one track so as to cause the vehicle to veer to the other side.

This steering shaft interconnecting the differentials is connected to one part of a three-part planetary-gear assembly which has another part that can be arrested by a brake and yet another part which is connectable through an intermediate planetary gear assembly to a steplessly adjustable drive. Typically this drive comprises a pump and motor arrangement having an input side connected to the drive engine and an output side connected to one part of the three-part intermediate planetary gear assembly.

In one known system the sun gear of the primary planetary gear assembly is connected with the output part of the intermediate planetary gear assembly. The output side of the steplessly variable drive of transmission connected between the engine and this intermediate planetary gear assembly therefore allows relatively fine steering control to be obtained. In such a system the ring gear of the intermediate planetary gear assembly is both connected to a brake and through a coupling or a bevel-gear assembly to the drive engine so as to permit it to be arrested or driven in the opposite direction.

Such an arrangement has the disadvantage that it does not provide uniform steering deflection. Thus, for instance, relatively minor steering deflection is obtained by arresting the ring gear of the intermediate gear assembly with the brake and driving the primary gear assembly through this intermediate assembly with the steplessly variable transmission. A sharper turn is effected by opening the brake and reverse driving this ring gear with the drive engine. Typically the switchover from the instant in which the ring gear is arrested and that in which it is driven in the opposite direction causes the vehicle to veer sharply, therefore making steering somewhat difficult. It has been found almost impossible in this type of system to eliminate this jumpy steering.

A simple manner of overcoming this difficulty has been to provide very large and powerful steering drive which has an input side connected to the drive engine and an output side connected through gearing to the steering shaft. This heavy-duty drive is steplessly variable so that it alone rotates the steering shaft in the sense necessary to turn the vehicle in either direction and therefore must all alone dispose of sufficient power to carry out any necessary steering operations. Such a system, although relatively sure and simple, has the disadvantage that it is necessary to provide an extremely large steering drive in order, for instance, to make a sharp turn while climbing a hill or during a similar operation.

OBJECTS OF THE INVENTION

It is therefore an object of the present invention to provide an improved steering system for a tracked vehicle.

Yet another object is the provision of an improved method of and apparatus for driving and steering a full-track vehicle.

Another object is the provision of such a system that is capable of using a relatively low-power steering drive, but wherein sure and uniform steering and handling characteristics are obtained.

SUMMARY OF THE INVENTION

These objects are attained according to this invention in a steering and drive system for a tracked vehicle of the above-described general type having a three-part right-turn planetary gear assembly having one part connected to the drive engine, a three-part left-turn planetary gear assembly having one part connected to the engine, and a right- and left-turn brake each operable on another part of the respective gear assembly. A link interconnects yet another part of the right-turn assembly with yet another part of the left-turn assembly and a variable-speed transmission has an input side connected to the engine and an output side. A three-part primary planetary gear assembly has one part connected to the steering shaft and another part connected to the output side of the variable-speed transmission. A primary brake is operable on yet another part of the primary assembly and a three-part intermediate planetary gear assembly has one part connected to the steering shaft, another part connected to the output side of the transmission, and yet another part connected to the link. Control means is provided for steplessly increasing the transmission ratio of the transmission from a minimum speed to a maximum speed while holding the primary brake closed on the respective part of the primary gear assembly and for thereafter decreasing the transmission ratio and releasing the primary brake while closing one of the turn brakes on the respective part.

Thus as the steering wheel of the vehicle is turned the right- and left-turn brakes are, to start with, both released and the primary brake is locked so that the output speed of the variable-speed transmission increases in the necessary direction from a minimum to a maximum and is effective only through the primary gear assembly on the steering shaft. Once the variable-speed transmission has attained maximum output speed the turn brake for the turn direction being taken is then closed and the primary brake is released. Thereafter the top speed is decreased from its maximum speed toward its minimum speed. This action causes the output rotation of the drive engine to be effective through the respective turn gear assembly with subtraction therefrom of the transmission output rotation in the intermediate planetary gear assembly in such a manner as to increase the rotation speed of the latter. Gearing of the various assemblies is such that when the output side of the transmission has come to a halt with one of the turn brakes locked the steering shaft will be rotating in the necessary sense at approximately two thirds of its maximum speed. Thereafter rotation of the output side of the variable transmission in the opposite direction will add to the engine-derived rotation to further increase the rotation speed of the steering shaft so as to cause the vehicle to veer ever more sharply.

Thus the control means is effective for a turn in one direction first to lock the primary brake and increase the speed of the output side of the transmission from zero to its maximum speed with rotation in one sense. Then the respective turn brake is locked, the primary brake is released and the speed is decreased in this one sense from maximum back to zero, and is then increased from zero to its maximum speed again but with rotation in the opposite sense. During this increase and decrease and reversal of the rotation speeds of the output side of the variable-speed transmission the angular rotation speed of the steering shaft increases uniformly so that a regular handling characteristic is obtained. This is due to the fact that the gearing is so dimensioned with respect to the output speed of the variable-speed transmission and the engine speed that when this transmission is operating at maximum speed with the primary brake closed the gear-assembly parts engageable by the turn brakes are still standing and these brakes can be closed without causing the vheicle to lurch or steer irregularly.

Therefore in accordance with the present invention the variable-speed transmission used for steering need only provide one third of the necessary power to rotate the steering shaft. For minor deflections, that is less than one third of the maximum possible deflection, the variable-speed transmission alone serves to rotate the steering shaft. For the second third the engine power is used with the variable-speed transmission serving to decrease the amount of engine power transmitted to the steering shaft. In the last third the opposite rotation of the variable-speed transmission is added to the force from the drive engine being transmitted to the steering shaft. Thus the various planetary gears are effective in a 3:1 ratio. Such a system allows a relatively compact variable-speed transmission, usually a simple axial-piston pump connected directly to the drive engine and having a swash plate controlled by the steering wheel or other guide elements for the vehicle, to be used with a hydraulic motor connected to the output side of the pump and itself having an output side connected to the sun gears of the primary and intermediate planetary gear assemblies.

According to the present invention the sun gears of the turn assemblies as well as the input side of the transmission are connected to the engine. The one turn brake is connected to the respective ring gear and the other turn brake is connected to the respective planet carrier. The ring gear of this latter turn brake is connected to the planet carriers of the intermediate assembly and of the one turn brake. In addition the steering shaft is connected to the planet carrier of the primary assembly and the ring gear of the intermediate assembly whereas the primary brake is effective on the ring gear of the primary assembly.

In accordance with yet another feature of this invention the control means comprises a cam connected to the steering wheel or other steering organ of the vehicle. This cam has a Z-shaped camming surface connected via an operating element or link to the pump of the variable-speed transmission. For straight-ahead travel of the vehicle the link lies in the middle of the cam and for turning in either direction the speed is first increased and then decreased and reversed as described above. In addition this cam is provided with surfaces which coact with switch means, here in the form of hydraulic valves, which actuate the primary brake and right- and left-turn brakes of the system in the necessary order. The primary brake is not released until one of the turn brakes is actuated and neither of the turn brakes is released until the primary brake is actuated. This overlapping of function insures that a uniform steering characteristic is obtained.

According to another feature of the present invention means is provided for reducing the drive engine speed when the force being exerted by the variable-speed transmission exceeds a predetermined value and/or the rotation speed of the steering shaft exceeds a predetermined angular velocity. A governor connected to a reversing valve effective on the carburetor of the engine will constitute the means for reducing the engine speed when the steering-shaft speed exceeds a predetermined rate. A pressure-operated reversing valve connected to the hydraulic motor forming part of the variable-speed transmission may be used similarly to act on the carburetor. It also lies within the scope of this invention to provide an arrangement which increases engine speed under these circumstances, as with increased engine speed, and hence increased ground speed, a lesser speed differential is needed between the two tracks to achieve the same course deviation.

BRIEF DESCRIPTION OF THE DRAWING

The above and other objects, features, and advantages, will become more readily apparent from the following, reference being made to the accompanying drawing, in which.

SPECIFIC DESCRIPTION

Figure 1:
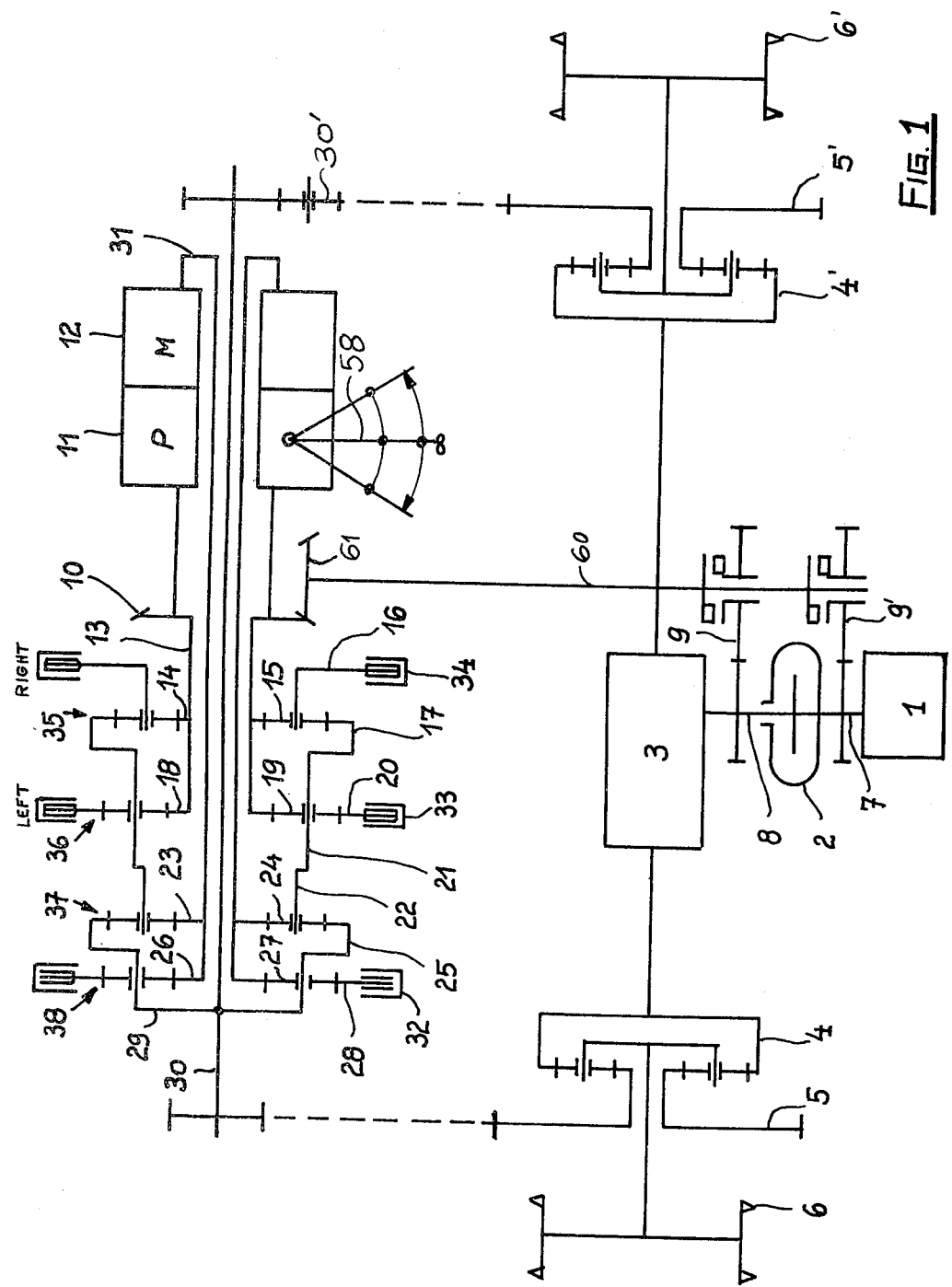
FIG. 1 is a schematic diagram illustrating the system according to the present invention.

The arrangement shown in FIG. 1 has a diesel engine 1 connected via a torque converter 2 to a transmission 3 connected on both sides to the ring gears of summing differentials 4 and 4' having sun gears 5 and 5' connected to a control system described below and planet carriers connect to drive sprockets 6 and 6' coupled to respective tracks as described on page 399 of *PRINCIPLES OF AUTOMOTIVE VEHICLES* (U.S. Government Printing Office: 1956).

A common steering shaft 30 is connected directly to the planet carrier 5 and through a reversing gear 30' to the planet carrier 5' so that rotation of this shaft 30 in one direction will cause the one sprocket 6 to rotate faster than the other sprocket 6' and rotation in the opposite sense will cause the other sprocket 6' to rotate faster than the sprocket 6.

A two-part driveshaft 7, 8 extend from the Diesel engine 1 to the transmission 3 and to each side of the torque converter 2 there is provided a jaw clutch 9 and 9' alternately closable to connect a shaft 60 carrying at its end a bevel gear 10 carried on a hollow shaft 13 surrounding another hollow shaft 31 itself surrounding the steering shaft 30. Thus the drive engine 1 continuously rotates the hollow shaft 13 always in the same direction at a rate directly proportional to the engine speed. A transmission comprising an axial-piston pump 11 having a control element 58 and directly connected to a hydraulic motor 31 is connected between the shaft 13 and the shaft 31. Thus when the element 58 is in a central position no rotary force is transmitted between the shaft 13 and the shaft 31. To one side of this position the shaft 31 is rotated in one sense and to the other side of the position of the element 58 the shaft 31 is rotated in the opposite sense.

The shaft 31 carries on its end opposite the end connected to the output of the transmission 11, 12 a pair of sun gears 23 and 26 of respective planetary gear assemblies 37 and 38. The planetary gear assembly 38, or so-called primary assembly, has a planet carrier 29 directly and fixedly connected to the shaft 30. The planet gears 27 carried by this carrier 29 mesh externally with a ring gear 28 provided in a primary brake 32 and internally with the sun gear 26. The so-called intermediate planetary gear assembly 37 has a ring gear 25 directly linked through the planet carrier 29 to the shaft 30.

The shaft 13 carries the sun gears 14 and 18 of a right-turn planetary gear assembly 35 and a left-turn planetary gear assembly 36. The planetary gears 15 of the right-turn assembly 35 are mounted on a carrier 16 connected to a brake 34. A similar brake 33 acts on the ring gear 20 of the left-turn assembly 36. The planetary gears 19 of the left-turn assembly 36 are mounted on a carrier 21 linked to the carrier 22 of the planetary gears 24 of the assembly 37 and to the ring gear 17 of the assembly 35. The assemblies 35–38 are all geared substantially identically, in a 3:1 ratio.

The system functions as follows:

For normal straight-ahead travel the swash plate of the pump 11 is held perpendicular to the central axis of the pump so that the output shaft 31 is fixed. At the same time the brake 32 is closed so as to fix the ring gear 28. This effectively locks the entire planetary gear assembly 38 and prevents rotation of the shaft 30, therefore preventing the sun gears 5 and 5' from rotating relative to one another and allowing one of the sprockets 6 from turning faster or slower than the other sprocket 6'. At the same time the left-hand turn brake 33 and the right-hand turn brake 34 are both open so that no force is transmitted to the link 21, 22.

For a small deviation to the left, for example, the brake 32 remains closed while brakes 33 and 34 remain open and the control member 58 is moved in the direction for a left-hand turn. This causes the shaft 31 to rotate in a predetermined direction thereby rotating sun gear 26 in the same direction and driving the planet carrier 29, and hence the shaft 30, in the same direction one third as fast. The extent of deflection of the element 58 will determine the speed and rotation sense of the shaft 31, and the speed and rotation sense of the shaft 30 which is proportional to the differential in angular speeds between the sprockets 6 and 6'.

In order to make the turn yet sharper the left-turn brake 33 is then closed and the primary brake 32 is opened. Then the lever 58 is moved back toward and central position. This causes the engine rotation transmitted to the shaft 13 to be transmitted at one third speed to the planet carrier 21 and thence to the planet carrier 22. The difference in speed between the primary carrier 22 and the shaft 31 is picked up by the ring gear 25 and transmitted to the shaft 30. In view of the like gearing and toothing of all of the assemblies 35–38 this will cause the shaft 30 to rotate at an ever increasing rate as the shaft 31 is slowed down.

For yet a sharper turn the lever 58 is moved past the neutral position in the opposite direction so as to rotate the shaft 31 in the opposite direction, thereby making the differential between the speeds of the planet carrier 22 and the sun gear 23 even greater and concomitantly increasing the speed of the ring gear 25. This increases the rotation speed of the shaft 30 to a maximum. For a turn to the opposite side the same steps are followed but with the brake 34 closing instead of the brake 33 and the lever 58 being moved in opposite directions.

Figure 2:
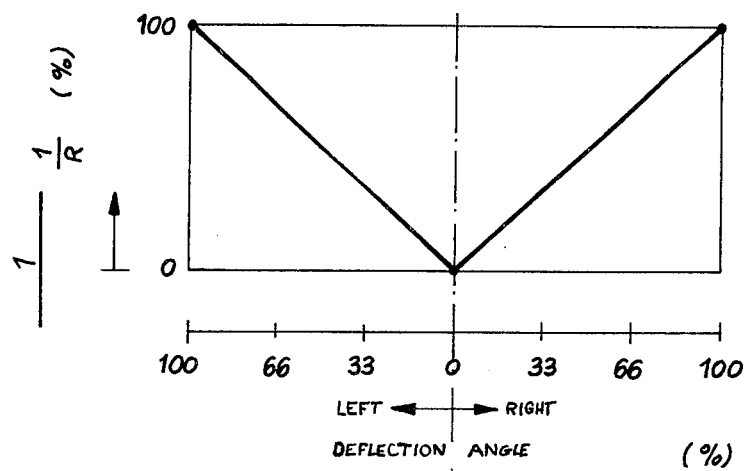
FIGS. 2–5 are diagrams illustrating operation of the system according to the present invention.

FIG. 2 shows the relationship between the deflection angle of the steering organ and the deflection radius produced thereby, with the amount of deflection to the right and the left shown on the abscissa and the deviation from a straight line path shown on the ordinate. Thus as the steering organ, here a steering wheel 39 (FIG. 6), is deflected from a central zero position to a maximum deflection of 100 percent in either direction a maximum deviation from 0 to 100 from a straight line course is obtained. The two deflections are in direct proportion so that the curve is straight in both direction from the origin.

Figure 3:
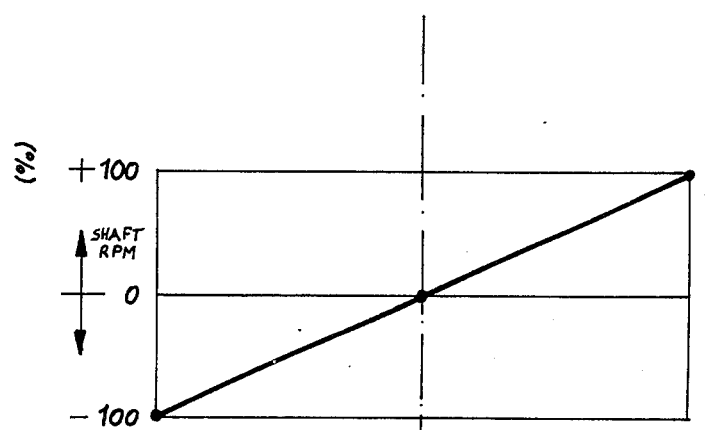

FIG. 3 indicates how in reality the deflection of the steering organ 39 to either side is reflected in the increase in rotation speed of the shaft 30. Thus for a maximum deflection toward the right a rotation rate of +100 is necessary and for maximum deflection toward the left a rotation rate in the opposite direction of −100 is obtained.

Figure 5:
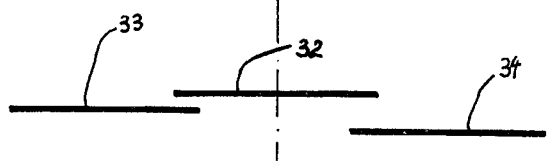

This is obtained according to the present invention with a pump 11 rotatable at a rate taken by way of example to be between 100 rpm in one direction (+100) and 100 rpm in the other direction (−100). FIG. 5 indicates the periods when the brakes 32, 33 and 34 are closed during this steering operation according to the present invention. Thus for a right-turn the steering wheel is deflected towards the right and the pump speed is increased from zero to $a$, its maximum rpm. Just before obtaining this maximum speed $a$ the brake 33 is closed. After obtaining the maximum speed $a$ the pump speed is decreased to zero rpm at point $b$, with the brake 32 releasing shortly after point $a$ is passed. Thereafter the pump speed is increased to −100 rpm with only the brake 33 closed until point $c$ is obtained corresponding to maximum vehicle deflection with maximum deflection of the steering organ 39.

For a left-hand turn the speed is decreased to −100 rpm at point $a'$ and then through 0 rpm at point $b'$ to +100 rpm at point $c'$. Meanwhile the brake 32 is released and the brake 34 is closed, with the two brakes being simultaneously closed and overlapping at point $a'$.

Figure 6:
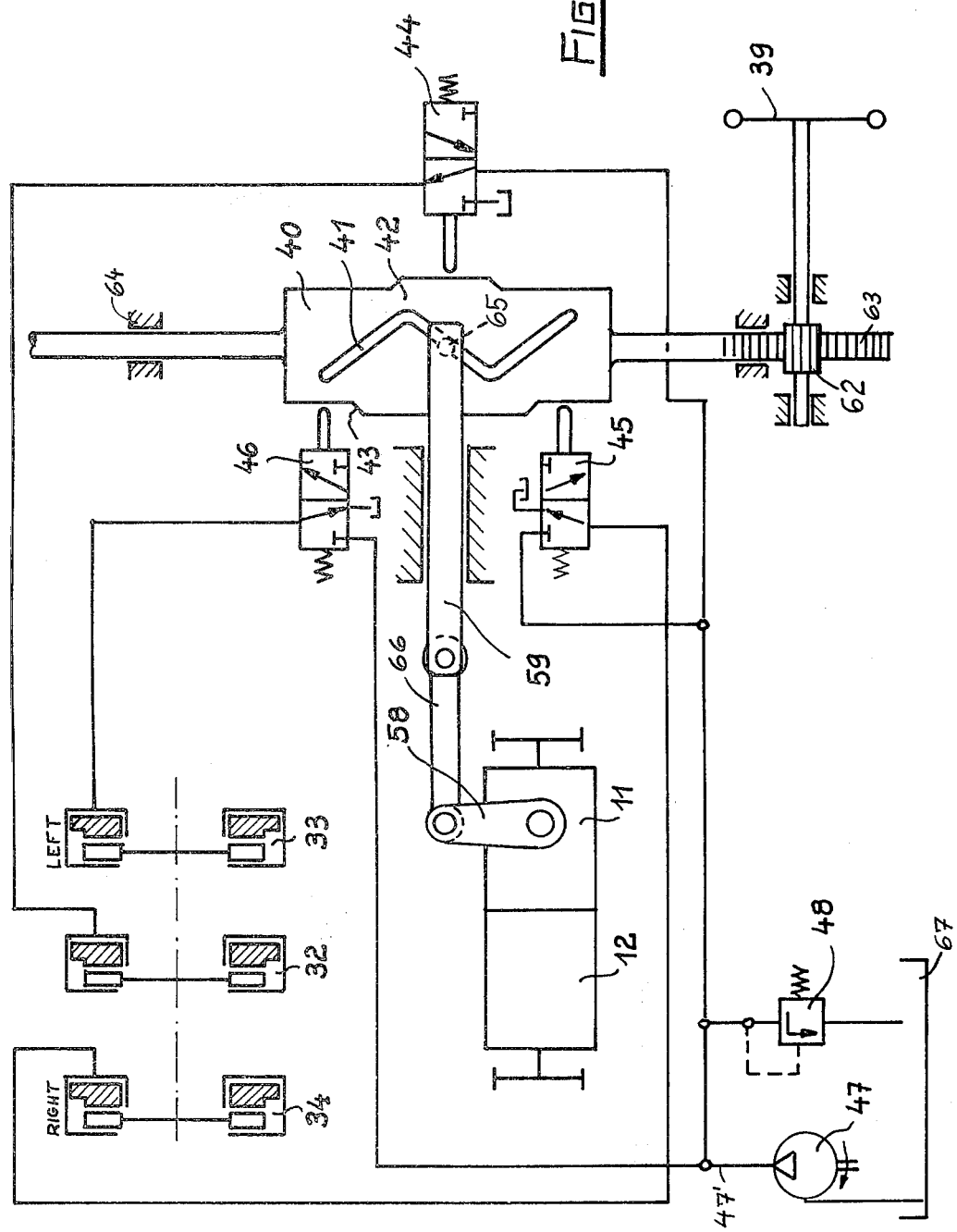
FIGS. 6 and 7 are diagrammatic views illustrating aspects of the system according to FIG. 1.

This effect is achieved according to FIG. 6 in an arrangement wherein the steering wheel 39 carries a pinion 62 meshing with a rack 63 slideable on the frame 64 of the tracked vehicle and carrying a sliding cam 40 formed with a zigzag cam slot 41. A cam follower 65 engages in the slot 41 and is carried on a slider 59 connected via a link 66 to the control element 68 of the pump 11.

Figure 4:
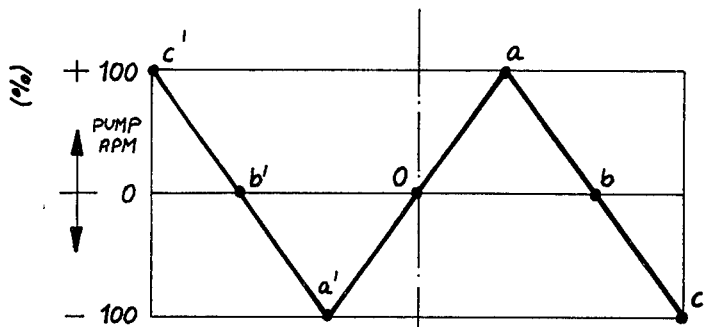

A pump 47 operated continuously by the engine 1 has an input side connected to a reservoir 67 and an output side 47' connected to the reservoir 67 through a pressure-regulating valve 48 and to various reversing valves 44, 45, and 46. The valve 44 controls the primary brake 32 and is operated by a cam formation 42 at the center of the cam 40. Valves 45 and 46 are operated alternately and are controlled by single cam formation 43 formed on the slide 40 opposite the formation 42. In this manner in a central position only the valve 44 is actuated so as to lock the brake 32 but when moved to either side first one of the valves 45, 46 is actuated and then the valve 44 slips off its cam 42 and the brake 32 is released. It can be seen that the shape of cam formation 41 corresponds generally to the graph of FIG. 4 so that as the steering wheel 39 is rotated for a right- or a left-hand turn the pump output speed is brought from zero to a maximum value in one sense then back to zero and then to a maximum value in the opposite sense.

Thus in accordance with the present invention in the first third of its possible steering deflection the transmission 11, 12 alone serves to rotate the shaft 30. Once this transmission 11, 12 has reached a maximum speed the engine is effective via a gear 61 on shaft 60 to rotate the shaft 30 in one direction or the other, depending on the side to which the vehicle is to be turned, but with the rotation of the transmission 11, 12 being effectively subtracted from the rotation of the shaft 13. Finally the rotation of the pump 13, in the further stages of steering when the greatest deflection is obtained, is added to the force of the engine transmitted via the gear 10 so as to achieve a cumulative effect for maximum steering deflection. In this manner a pump having only one third of the necessary power to achieve maximum deflection need be provided.

Figure 7:
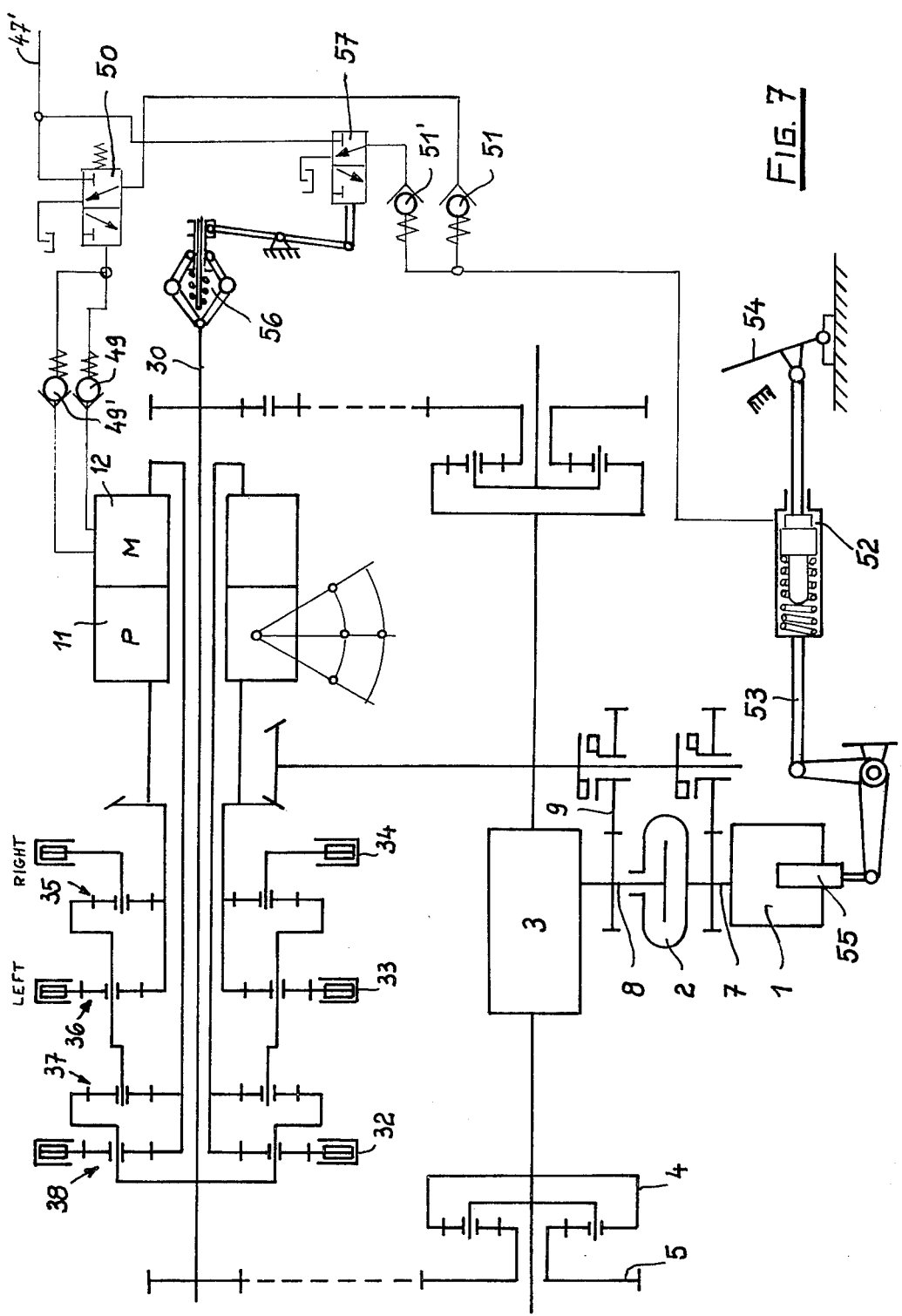

FIG. 7 shows how the motor 12 can be connected via a pair of check valves 49 and 49' to a reversing valve 50 whose output is connected via another check valve 51 to a cylinder 52 connected to the rod 53 extending between the accelerator pedal 54 and the carburetor 55 of the engine 1. Thus if the pressure in the motor 12 exceeds a predetermined safe limit with rotation in either direction the pressurized fluid from output side 47' of the pump (FIG. 6) will be transmitted to the cylinder 52 to reduce fuel feed to the engine 1 by effectively shortening the rod 53.

Similarly a governor 56 is carried on the shaft 30 which is connected through a reversing valve 57 connected between the input line 47' and the cylinder 52, with another check valve 51' between the valve 57 and the cylinder 52. In this case if the rotation speed of the shaft 30 exceeds a predetermined limit the valve 57 is swtiched over and the fuel feed to the engine 1 is reduced. In this arrangement blowout of the motor 12 or pump 11 is prevented. Similarly spinning around in one place of the vehicle caused by runaway rotation of the shaft 30 is prevented also. It should be noted that in some cases it might be advantageous to connect the safety valve 50 and 57 up such that they increase the gas flow to the engine, as this will increase the amount of force transmitted to the gear 10, thereby reducing the amount of force needed to be exerted by the motor 12, and will increase the speed of displacement of the vehicle so that a lesser deflection will be required for the same steering correction.

We claim:

1. A steering and drive system for a tracked vehicle having an engine connected to a pair of tracks through a pair of differentials interconnected by a steering shaft rotatable in one sense to advance one track faster than the other and in another sense to advance said other track faster than said one track, said system comprising:
    a three-part right-turn planetary gear assembly having one part connected to said engine;
    a three-part left-turn planetary gear assembly having one part connected to said engine;
    a right-turn brake operable on another part of said right-turn assembly;
    a left-turn brake operable on another part of said left-turn assembly;
    a link interconnecting yet another part of said right-turn assembly with yet another part of said left-turn assembly;
    a variable-speed transmission having an input side connected to said engine and an output side;
    a three-part primary planetary gear assembly having one part connected to said steering shaft and another part connected to said output side;
    a primary brake operable on yet another part of said primary assembly;
    a three-part intermediate planetary gear assembly having one part connected to said steering shaft, another part connected to said output side, and yet another part connected to said link; and
    control means for steplessly increasing the transmission ratio of said transmission from a minimum speed to a maximum speed while holding said primary brake closed on the respective part of said primary assembly and for thereafter decreasing said transmission ratio and releasing said primary brake and selectively closing either of said turn brakes on the respective part.

2. The system defined in claim 1 wherein said transmission includes a hydraulic pump, a hydraulic motor connected to said pump, and an actuating element displaceable from a central position corresponding to nonrotation of said output side, to a pair of opposite offset positions corresponding to maximum rotation of said output side on corresponding opposite senses.

3. The system defined in claim 2 wherein said control means includes a steering organ and a cam carried by a steering organ and having a camming surface operatively engageable with said actuating element, said surface being generally Z-shaped.

4. The system defined in claim 1 wherein said turn assemblies have respective sun gears constituting the respective one parts, one of said turn assemblies having a planet carrier constituting the respective other part and connected to the respective brake and the other turn assembly having a ring gear constituting the respective other part and connected to the respective brake.

5. The system defined in claim 4 wherein said primary assembly and said intermediate assemblies have respective sun gears constituting the respective other part connected to said output side, said primary assembly having a ring gear constituting said yet other part and connected to said primary brake.

6. The system defined in claim 1 wherein said assemblies are of substantially similar construction with substantially similar gear ratios.

7. The system defined in claim 1, further comprising means for detecting the force exerted by said transmission at said output side on said primary and intermediate assemblies for reducing the speed of said engine on said force exceeding a predetermined limit.

8. The system defined in claim 1, further comprising means for detecting the rotation speed of said steering shaft and for decreasing the speed of said engine on said rotation speed exceeding a predetermined limit.

9. A method of steering a full-track vehicle having an engine connected to a pair of tracks through a pair of summing differentials interconnected by a steering shaft rotatable by a steplessly variableand reversible transmission in one sense to advance one track faster than the other and in another sense to advance said other track faster than said one track, said method comprising the steps of:

driving said steering shaft exclusively with the transmission output in a first mode corresponding to limited lateral steering deflection and varying the lateral steering deflection in said first mode solely by varying the speed and direction of said transmission output, driving said steering shaft with the engine output in a second mode corresponding to greater lateral steering deflection than said first mode and varying the deflection in said second mode by varying the transmission output and substracting same from said engine output, and driving said steering shaft with said engine output and said transmission output in a third mode corresponding to greater lateral steering deflection than said first and second modes and varying the deflection in said third mode by varying the transmission output and adding same to said engine output.

10. The method defined in claim 9 wherein said engine output and said transmission output are fed to separate parts of a planetary gear assembly having a third part connected to said shaft, said outputs being added and subtracted at said assembly.

* * * * *